UNITED STATES PATENT OFFICE.

THOMAS B. ARMITAGE, OF NEW YORK, N. Y.

IMPROVEMENT IN PROCESSES OF REDUCING WOOD FIBER TO PULP.

Specification forming part of Letters Patent No. 139,646, dated June 10, 1873; application filed March 16, 1872.

*To all whom it may concern:*

Be it known that I, THOMAS B. ARMITAGE, of New York, in the county of New York, and State of New York, have invented a new and useful Improvement in the Process of Reducing Woody Fiber to Pulp, of which the following is a specification:

The object of this invention is to provide a method for disintegrating or reducing woody fiber for the manufacture of paper, and for other purposes; and it consists in subjecting woody matter, previously saturated with an alkaline solution, to the direct action of superheated steam, in the manner hereinafter described.

In carrying out my invention I generate steam, at the usual temperature, in any suitable vessel, and conduct it away from the generator as fast as made, and through a superheating tube or apparatus which is exposed to a high temperature. The woody matter may be previously prepared by first reducing to small chips or blocks of as nearly a uniform size as possible, giving preference to small-sized pieces, and then saturating this sized wood with a solution of caustic alkali of about 2° or 2.5° specific gravity, though, as some kinds of wood will reduce with a weaker solution, while other kinds may require a stronger solution, the specific gravity may be varied as occasion requires. I put the woody matter, thus prepared, into a suitable vessel mounted upon axles, horizontal or nearly so, which vessel is so connected with the steam-pipe as to permit of its being revolved without being disconnected from the pipe. I then discharge the current of superheated steam upon, into, and through the said prepared wood, and allow the steam to then escape, as freely as it entered, from the vessel into the atmosphere, keeping the temperature of the wood at about 350° to 400° Fahrenheit during the application of the superheated steam, and for about the period of an hour if the lower temperature is used, or about half an hour if the higher temperature is used, and in either case depending upon the sized mass under treatment and the strength of the alkali. And during the whole time that the steam is being applied to the chips the vessel is slowly revolved upon its axis, so as to prevent dripping and consequent ununiform state of moisture among the chips, and, at the same time so agitating the mass as to cause the steam to act with uniformity upon every chip. At this stage the fibers will be found in a completely disintegrated state, and merely requiring the customary washing in the ordinary vessels or machines used for such purposes to be ready for use. This after treatment is no part of my invention, however, as I devise and wish to patent only a method for the disintegration of woody fiber.

By this procedure the following effects are produced: First, by the admission of steam to the mass undergoing agitation, the chips are all attacked under the same circumstances simultaneously. Second, by the agitation caused by rotation of the vessel on the horizontal axis dripping is prevented, and consequently the chips are in an uniform state of moisture. The alkali solution is uniformly distributed through the chips, and when steam is applied the reduction goes on uniformly and simultaneously in each chip. Third, the continued presence of the steam, while it communicates the requisite heat, prevents evaporation and consequent strengthening of the alkali solution, causing it to act uniformly during the whole process. Coloring compounds are also kept in dilute form, in which condition they will act very slowly in discoloring the fiber. Fourth, the action is so uniform and rapid that disintegration is completely effected without any portion of the mass having been so long under action of the alkali as to have lost its strength of fiber; and the dyeing process has had so little time to act, and in so dilute a form, that the subsequent washing of the mass leaves it nearly colorless. Fifth, all pressure is avoided.

In all cases I use the superheated steam, applied directly upon and into the matter under treatment, and without pressure, depending entirely upon its temperature and disintegrating qualities for the results.

Having thus described my invention, I claim as new and desire to secure by Letters Patent—

The above process of disintegrating woody fiber, wherein the woody matter in a revolving vessel is subjected to heat in the form of free steam without pressure, substantially as described.

THOS. B. ARMITAGE.

Witnesses:
T. B. MOSHER,
GEO. W. MABEE.